Patented Mar. 16, 1943

2,314,313

UNITED STATES PATENT OFFICE 2,314,313

CASING TREATMENT

Cleo A. Rinehart, Chicago, Ill., assignor to Industrial Patents Corporation, Chicago, Ill., a corporation of Delaware No Drawing. Application August 15, 1940,
Serial No. 352,821

7 Claims. (Cl. 99—175)

This invention relates to the manufacture of casings for sausages and the like and has to do particularly with improvements in the tendering of such casings by the use of enzymes.

Casings used for the encasement of meat, such as sausages, are often tough and undesirable for use in the manufacture of high grade products. Consequently, it is necessary to use selected tender casings or to tenderize tough casings in the manufacture of high grade products, particularly the best quality frankfurters and fresh pork sausage.

Natural casings which are normally tough, such as those prepared from the intestines of hogs, India sheep, and beef, may be tenderized by the use of enzymes of vegetable origin. For example, the juices of figs, Osage oranges and pineapple have been used for this purpose. The principal proteolytic enzymes present in these materials are ficin, macin and bromelin, respectively.

Heretofore in the tendering of natural casings with such enzymes, the casings after cleaning have been subjected to the action of the enzymes under tenderizing conditions for sufficient time to effect the desired amount of tenderizing. The tenderized casings were then subjected to temperatures sufficiently high to cook the product and destroy the enzyme. The cooking of the casings, however, impaired the softness or pliability thereof so that they tended to crack or burst. As a result, it has been necessary heretofore to fill the casings prior to tenderizing and cooking.

It is often desirable to secure a casing which is not only tender but also soft and pliable. This is particularly true in the manufacturing of casings wherein it is advantageous to stuff the casings after tenderizing. When the casing is tenderized without the cooking, however, the enzymatic action continues until excessive destruction of the product occurs.

An important object in the present invention is to control the action of the enzyme to obtain the desired amount of tenderizing without affecting the other properties of the casing.

The present invention contemplates broadly the tenderizing of casings by the use of enzymes and then the halting of the reaction at the desired point by destroying the enzymatic action with a suitable chemical. It has been found that oxidizing agents will destroy the enzyme so that the reaction may be quickly terminated after the desired reaction is obtained. Oxidizing agents suitable for this purpose include hydrogen peroxide, sodium hypochlorite, potassium persulfate, and sodium peroxide. I prefer to use hydrogen peroxide.

The oxidizing agents are preferably used in solution, for example a dilute aqueous solution. The tenderized casing may be contacted with the solution of oxidizing agent by dipping, spraying, brushing or other suitable means of contact.

For purposes of illustration, the invention will be described in more detail in connection with the use of hydrogen peroxide for the treatment of casings which have been tenderized with pineapple juice. It is to be understood, however, that other oxidizing agents may be used and that the treatment is also applicable to casings which have been treated with other enzymes. In the use of other oxidizing agents and other enzymes, variations in the time of treatment, temperature of treatment and concentrations of solutions may be varied to secure the desired results.

The cleaned casings are treated by dipping or spraying with a solution of pineapple juice containing one part of pineapple juice and between one and twenty-five parts of water. The casing is maintained in contact with the juice for a period of one to three hours at a temperature of about 80 degrees to 90 degrees F. The casings are preferably immersed in a bath of the juice and then the reaction allowed to proceed with the adhering juice in a tempering room in which a relative humidity of about 80 to 85 per cent is maintained.

After the desired amount of tenderizing is obtained, the casings with or without washing are treated by dipping, spraying or brushing with a solution of hydrogen peroxide. Good results have been obtained by immersing the casing in a dilute solution of hydrogen peroxide, for example, a solution containing about one-fourth to one per cent of about thirty per cent solution of hydrogen peroxide, and holding the casing in contact with the hydrogen peroxide solution for a few hours at room temperature. The casings are then washed with water to remove the hydrogen peroxide. The treated casings may be used immediately or they may be packed in salt for shipment or storage.

As an example of a practical method which may be employed, clean natural casings which have been freshly prepared or which have been stored in salt and the salt washed off are immersed in a solution containing one part of pineapple juice and fifteen parts of water and thereafter maintained in contact with the juice for two hours at 80 degrees to 90 degrees F. The casings are then placed in a solution containing one-half part of thirty per cent hydrogen peroxide to one hundred parts of water and held in contact with the solution for about two hours at around 70 degrees to 90 degrees F. The excess hydrogen peroxide is removed by washing the casing with water.

The casings prepared in this manner are tender and yet soft and pliable. By treating to secure the desired degree of tenderizing and then quickly terminating the enzymatic reaction with the oxidizing agent, the reaction may be controlled to produce a casing which retains sufficient toughness to be filled with sausage without rupture and yet be of such tenderness that it may be readily masticated.

The invention has the advantage that the tenderized casings may be salted and stored for use as desired. Also, the casings may be filled with materials which do not require the cooking which has been necessary heretofore to destroy the enzyme. Consequently, the cooking may be eliminated or only sufficient cooking used to cook the casings only.

I claim:

1. In the tenderizing of natural casings wherein an animal intestine normally tending to be tough is treated with a tenderizing enzyme to remove such toughness, the improvement which comprises quickly terminating the action of the enzyme when the desired tenderness is obtained by treating the tenderized casing with an oxidizing agent whereby the enzymatic action of the enzyme is substantially destroyed.

2. A process for the tenderizing of natural casings normally tending to be tough, which comprises treating the casing with a tenderizing enzyme of substantially the tenderizing properties of that occurring in pineapple juice, continuing the treatment until the desired tenderness is obtained, and then terminating the enzymatic action by subjecting the tenderized casing to the action of an oxidizing agent.

3. A process for tenderizing sausage casings, which comprises contacting the casing with a solution of a tenderizing enzyme of the type occurring in pineapple juice under tenderizing conditions, separating said solution when the desired tenderness is obtained, and halting the action of the enzyme by treating the casing with hydrogen peroxide.

4. A process according to claim 3 in which the tenderized casing is contacted with a solution containing about one-fourth to one per cent of about thirty per cent solution of hydrogen peroxide to halt the action of the enzyme.

5. A process for tenderizing casings made from relatively tough animal intestines which comprises treating the casings with a tenderizing, proteolytic enzyme until the desired condition of tenderness is obtained, and then sharply terminating the tenderizing action of the enzyme by subjecting the casings to the action of an oxidizing agent.

6. A process for tenderizing casings made from relatively tough animal intestines which comprises treating the casings with a tenderizing, proteolytic enzyme at a temperature of 80° to 90° F. for a period of one to three hours, and then sharply terminating the tenderizing action of the enzyme by subjecting the casings to the action of an oxidizing agent.

7. A process for tenderizing casings made from relatively tough animal intestines which comprises treating the casings with a tenderizing, proteolytic enzyme at a temperature of 80° to 90° F. for a period of one to three hours, and then sharply terminating the tenderizing action of the enzyme by treating the casings with a solution containing about one-quarter to one per cent of about thirty per cent solution of hydrogen peroxide.

CLEO A. RINEHART.